US012560228B2

(12) United States Patent
    Waltz et al.

(10) Patent No.:  US 12,560,228 B2
(45) **Date of Patent:      \*Feb. 24, 2026**

(54) ALL WHEEL DRIVE ELECTRIC TRANSMISSION

(71) Applicant: Dana Heavy Vehicle Systems Group, LLC, Maumee, OH (US)

(72) Inventors: William F. Waltz, Toledo, OH (US); Darren J. Ziskovsky, Bowling Green, OH (US); Jeffrey M. David, Cedar Park, TX (US)

(73) Assignee: DANA HEAVY VEHICLE SYSTEMS GROUP, LLC, Maumee, OH (US)

( \* ) Notice:   Subject to any disclaimer, the term of this patent is extended or adjusted under 35 U.S.C. 154(b) by 0 days.

This patent is subject to a terminal disclaimer.

(21) Appl. No.: 18/784,472

(22) Filed:      Jul. 25, 2024

(65)              Prior Publication Data

US 2025/0033465 A1      Jan. 30, 2025

Related U.S. Application Data

(60) Provisional application No. 63/515,754, filed on Jul. 26, 2023.

(51) Int. Cl.
    *F16H 37/08*        (2006.01)
    *B60K 1/00*          (2006.01)
                 (Continued)

(52) U.S. Cl.
    CPC ........... *F16H 37/082* (2013.01); *F16H 48/24* (2013.01); *B60K 2001/001* (2013.01);
                 (Continued)

(58) Field of Classification Search
    CPC ...... B60K 1/00; B60K 1/02; B60K 2001/001; B60K 17/16–165; B60K 17/20;
                 (Continued)

(56)              References Cited

U.S. PATENT DOCUMENTS 7,211,019 B2 \*   5/2007   Kirkwood .............. B60K 17/35
                                                        475/205
9,816,594 B2 \*  11/2017   Hart ...................... F16H 37/022
                 (Continued)

FOREIGN PATENT DOCUMENTS

CN          215552537 U   \*   1/2022
DE    102016220062 A1  \*   4/2018   ............... B60K 1/00

OTHER PUBLICATIONS

Waltz, W. et al., "Electric Axle," U.S. Appl. No. 18/784,452, filed Jul. 25, 2024, 44 pages.

(Continued)

*Primary Examiner* — James J Taylor, II
(74) *Attorney, Agent, or Firm* — McCoy Russell LLP

(57)              ABSTRACT

Methods and systems for an electric drive. The electric drive system includes, in one example, an electric machine, and a multi-speed transmission rotationally coupled to the electric machine, rotationally coupled to two output shafts. The multi-speed transmission includes a differentiating meshed planet compound planetary gear set rotationally coupled and positioned coaxial to a mode planetary gear set and a mode clutch configured to shift between two operating modes.

14 Claims, 6 Drawing Sheets

(51) Int. Cl.
    *F16H 48/11*         (2012.01)
    *F16H 48/24*         (2006.01)

(52) U.S. Cl.
    CPC ...... *F16H 48/11* (2013.01); *F16H 2200/0021*
      (2013.01); *F16H 2200/2005* (2013.01); *F16H*
      *2200/2023* (2013.01); *F16H 2200/2033*
      (2013.01); *F16H 2200/2064* (2013.01)

(58) Field of Classification Search
    CPC ...... H02K 7/006; H02K 7/116; B60L 15/007;
      B60L 15/2036; F16H 2200/0021; F16H
      37/08–0826; F16H 2200/202–2023; F16H
      2200/2005; F16H 2200/2033–2038; F16H
          2200/2064
    See application file for complete search history.

(56)           References Cited

U.S. PATENT DOCUMENTS

| | | | |
|---|---|---|---|
| 11,110,789 | B2 * | 9/2021 | Pinschmidt ............. F16H 48/36 |
| 11,794,575 | B2 * | 10/2023 | Glückler .................. B60K 1/00 |
| 11,994,195 | B2 * | 5/2024 | Beck ..................... F16H 37/082 |
| 2025/0035196 | A1 * | 1/2025 | Waltz ..................... F16H 37/08 |
| 2025/0035198 | A1 * | 1/2025 | Waltz ..................... F16H 48/11 |
| 2025/0043855 | A1 * | 2/2025 | Waltz ..................... B60K 1/02 |

OTHER PUBLICATIONS

Waltz, W. et al., "Electric Axle," U.S. Appl. No. 18/784,584, filed Jul. 25, 2024, 37 pages.
Waltz, W. et al., "Electric Axle," U.S. Appl. No. 18/784,614, filed Jul. 25, 2024, 37 pages.

* cited by examiner

ALL WHEEL DRIVE ELECTRIC TRANSMISSION

CROSS-REFERENCE TO RELATED APPLICATION

The present application claims priority to U.S. Provisional Application No. 63/515,754, entitled "ALL WHEEL DRIVE ELECTRIC TRANSMISSION", and filed on Jul. 26, 2023. The entire contents of the above-listed application are hereby incorporated by reference for all purposes.

TECHNICAL FIELD

The present description relates generally to an electric transmission.

BACKGROUND AND SUMMARY

Electric transmissions have been used in a variety of vehicle platforms to fulfill the electrification needs of different vehicle sectors. These electric transmissions include traction motors and gear trains which may be mounted in different arrangements depending on the spatial constraints and end-use goals of the vehicle platform. In some instances, electric transmissions have the ability to achieve greater flexibility with regard to powertrain architecture when compared to electric axles.

At least some electric transmissions have fallen short of achieving end-use design goals in relation to space efficiency, shifting functionality, and power density. For instance, some multi-speed transmissions use a multitude of parallel shafts and gears that create packaging challenges. Further, in previous multi-speed transmissions, all of the gearing is meshed but in certain modes torque is only transmitted through a portion of the gears, leaving other gears unloaded. Therefore, the unloaded gears create unavoidable bearing, mesh, and windage losses. The inventors have therefore recognized a desire to reduce the packaging space and increase the power density of electric transmissions.

The issues described above may be at least partially addressed by an electric drive system. The electric drive system, in one example, includes an electric machine and a multi-speed transmission that is rotationally coupled to the electric machine and rotationally coupled to two output shafts. The multi-speed transmission includes a front-rear differential rotationally coupled and positioned coaxial to a mode planetary gear set. The multi-speed transmission further includes a mode clutch that is configured to shift between two operating modes. In this way, the mode planetary gear set effectively achieves multiple gear ratio modes in a space efficient package, expanding the system's speed change capabilities. Further, using the coaxial arrangement of the front-rear differential and mode planetary gear set allows the axial length of the electric drive to be reduced, if desired.

In one example, the mode planetary gear set may be a Ravigneaux gear set that is rotationally coupled to the front-rear differential. Further, the mode clutch is configured to selectively ground a carrier or a ring gear in the Ravigneaux gear set, ground a sun gear in the Ravigneaux gear set, and rotationally couple the carrier or the ring gear to the sun gear in the Ravigneaux gear set. In this way, the Ravigneaux gear set space efficiently achieves three gear ratio modes.

In another example, the mode clutch is configured to selectively shift the mode planetary gear set into a first mode where the mode clutch grounds a carrier or a ring gear that are included in the mode planetary gear set and a second mode where the mode clutch rotationally couples the carrier to the ring gear. In this way, the mode planetary gear set achieves two speed functionality in a compact package that can be more easily integrated to a wide variety of vehicle designs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
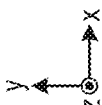
FIG. 1 shows an electric vehicle with an electric drive that includes a transmission with a mode planetary gear set.

A front-rear differentiating multi-speed electric transmission (e.g., a differentiating multi-speed all-wheel drive electric transmission) is described herein with mode select functionality that achieves increased compactness and power density. Further, the electric transmission may have a north-south architecture, in one example. To achieve the space efficiency and power density targets, the electric transmission includes a transmission which has a multi-speed mode planetary gear set and a front-rear differential in a coaxial package. To elaborate, the multi-speed gear set in the electric transmission includes a mode planetary gear set with a mode clutch for shifting between the gear modes.

In a first mode of the electric transmission, there is relative speed between the elements of the mode planetary gear set. In a highest mode (e.g., a second mode in a two-speed transmission, or a third mode in a three speed transmission) of the electric transmission, the mode planetary gear set may be locked up and rotates as one. The front-rear differential planetary gear set may also rotate as one and differentiates solely if the vehicle has a front to rear axle bias or is turning. In practice, the transmission may likely be operated in the highest mode to a greater extent of its operational life than the lower modes (e.g., the majority of the time). In the highest operating mode where there is little or no relative component rotation within the front-rear differential and no relative component rotation within the mode planetary gear set, gear mesh noise will decrease, component wear decreases, component life increases, frictional losses decrease, and windage losses decrease, thereby increasing the transmission's overall efficiency.

Further, in the electric transmission, the front-rear differentiating component may be formed as a meshed planet compound planetary gear set, in one example. The electric transmission may passively differentiate mechanical power from an electric machine or other suitable central power source to multiple front and rear axle differentials (e.g., a front axle differential and a rear axle differential). In this way, the demand for multiple independent electric axles, multiple power inverters, and accompanying support electronics may be eliminated, if wanted. Consequently, the size and complexity of the electric drive is reduced and the power density of the electric drive is increased, thereby increasing customer appeal. The electric transmission may be front mounted, mid-mounted, or rear mounted offering design flexibility. Further, in one example, the front or rear electric transmission outputs may further be actively braked to transfer more power to the opposite front or rear axle differentials. Still further, in one example, the electric transmissions described herein may be used with solid axles, independent suspension systems, or a combination of both types of axles.

The electric transmission may take the form of a two speed transmission, in one example, where the mode planetary gear set is formed as a meshed planet compound planetary gear set with two sets of planet gears which are in mesh and are circumferentially aligned in the same plane as a ring gear and a sun gear, or where the mode planetary gear set is formed as a simple planetary gear set with one set of planet gears which is in mesh with and is circumferentially aligned in the same plane as a ring gear and a sun gear. In this way, the electric transmission compactly achieves two speed functionality with a high power density, and each mode's output rotating in the same direction as the input to the mode planetary multi-speed transmission, in one example.

In another example, the electric transmission may specifically take the form of a three speed transmission, where the mode planetary gear set is a Ravigneaux planetary gear set. In the Ravigneaux planetary gear set, a meshed planet compound planetary gear set and a simple planetary gear set share a common ring gear and a planet gear (or a stepped planet gear). Further, in the Ravigneaux planetary gear set, two sun gears may mesh with the two sets of planet gears, respectively. In this way, the modes of the transmission are expanded in a compact and power dense transmission architecture.

The abovementioned layouts of the electric transmission allow for a transmission disconnect clutch, and/or a front-rear differentiating locking clutch to be easily and effectively incorporated into the transmission, allowing for added features that may be difficult to package on individual electric axles.

FIG. 1 shows an example of an electric drive 100 with a transmission 102 that includes a mode planetary gear set 104. Thus, the transmission may be referred to as an electric transmission. The electric drive 100 further includes a differential 105 (e.g., a front-rear differential). The front-rear differential 105 is specifically illustrated as a differentiating meshed planet compound planetary gear set in FIG. 1, and therefore is referred to as such. However, it will be understood, that other types of front-rear differentials may be used instead of the differentiating meshed planet compound planetary gear set, shown in FIG. 1 and the other differentiating meshed planet compound planetary gear sets, described herein. For instance, the front-rear differential may be a dual sun gear differential which may be configured as an open differential or a limited slip differential, a bevel gear differential, a reduction differential, and the like as discussed in greater detail herein. The mode planetary gear set 104 and the differentiating meshed planet compound planetary gear set 105 are discussed in greater detail herein.

The electric drive 100 is included in an electric vehicle (EV) 103, in the illustrated example. It will be understood that the other electric drives described herein may also be included in a similar EV. The EV 103 may be an all-electric vehicle (e.g., battery electric vehicle (BEV)), in one example, or a hybrid electric vehicle (HEV), in another example. As such, vehicles that utilize the electric drives described herein may also have an internal combustion engine (e.g., a spark ignition engine, a compression ignition engine, combinations thereof, and the like), in some examples.

In the HEV example, an engine and transmission may be used in conjunction with a transmission 102. The engine and transmission may be a parallel power path and couple to mechanical components 138 or 139 (which are discussed in greater detail herein). Continuing with the HEV example, in an engine propulsion mode, the engine and transmission may be rotationally coupled to either group of mechanical components 138 or 139 which may be rotationally coupled to a transmission 102. Further, in the engine propulsion mode, the front-rear differential locking clutch 146 is engaged and the transmission disconnect clutch 147 is disengaged to reduce (e.g., minimize) mode planetary 104 losses. In a first example, electric drive 100 supplies no power and the engine propels all of the wheels such that the powertrain exhibits locked four-wheel drive functionality. In another example, the front-rear differential locking clutch 146 is disengaged and the transmission disconnect clutch 147 is disengaged. In such an example, the engine powers one of the mechanical components 138 or 139 such that the powertrain exhibits locked two-wheel drive functionality. Further, in such an example, the differential 105 rotates from the unpowered wheels.

The electric drives described herein may be used in cars, trucks, all-terrain vehicles (ATVs), commercial vehicles, light vehicles, off-highway vehicles, mining vehicles, rail vehicles, manufacturing machinery, industrial machinery, and the like.

The transmission 102 is designed to provide mechanical power to an axle assembly 107 and an axle assembly 109, as discussed in greater detail herein. In this way, the electric drive 100 is designed to provide the vehicle with all-wheel drive functionality when the front-rear differential locking clutch 146 is disengaged and four-wheel drive functionality when the front-rear differential locking clutch 146 is engaged. It will be appreciated that the other electric drives and the transmissions included therein may be incorporated into all-wheel drive vehicles.

Further, the mode planetary gear set 104 is a Ravigneaux gear set, in the illustrated example. To expound, the Ravigneaux gear set 104 comprises two sets of planetary gears where one set is a simple planetary gear set and the other set is a meshed planet compound planetary gear set in the illustrated example. However, the Ravigneaux gear set may have a greater number of planetary gear sets, in other examples. Specifically, in the illustrated example, the Ravigneaux mode planetary gear set 104 includes a first sun gear 106 and a carrier 108 with a set of planet gears 110 rotatably mounted thereon. However, the mode planetary gear set may be a meshed planet compound planetary gear set with two-speed functionality, as discussed in greater detail herein with regard to FIG. 6, or the mode planetary gear set may be a simple planetary gear set with two-speed functionality, as discussed in greater detail herein with regard to FIG. 8.

In the illustrated example, the sun gear 106 meshes with the planetary gears in the set of planet gears 110. The mode planetary gear set 104 further includes a ring gear 114, a set of planet gears 116, and a second sun gear 118, in the illustrated example. Further, in the illustrated example, the ring gear 114 meshes with the planetary gears in the set of planet gears 110. Even further in the illustrated example, the planetary gears in the second set of planet gears 116 mesh with the sun gear 118 as well as the gears in the set of planet gears 110. An input shaft 119 is rotationally coupled to the sun gear 118, in the illustrated example. Various architectures for providing rotational input to the mode planetary gear set are expanded upon herein. The set of planet gears 110 and the set of planet gears 116 are rotatably mounted to the carrier 108.

The mode planetary gear set 104 is specifically configured to shift between three modes, in the illustrated example. However, electric drives with a fewer or greater number of speeds, such as a two-speed electric transmission, a four-speed electric transmission, a five-speed electric transmission, etc., have been contemplated. To enable the multi-speed functionality of the transmission, a mode clutch 120 is provided in the transmission. The mode clutch 120 is configured to ground the carrier 108 in a first mode, ground the first sun gear 106 in a second mode, and rotationally couple the carrier 108 and the first sun gear 106 in a third mode. The mode clutch 120 is in the second mode in the illustrated example. However, the mode clutch 120 may be switched into the different modes based on operating conditions of the electric drive and/or vehicle. Further, the first mode has a higher gear ratio than the second mode, and the second mode has a higher gear ratio than the third mode. The specific gear ratios associated with the modes may be selected based on factors such as electric motor type and performance characteristics, vehicle weight, vehicle performance targets, and the like.

The mode clutch 120 may be a dog clutch, a synchronizer, a friction clutch (e.g., a wet friction clutch), a radial clutch, a face clutch, a curvic clutch, a magnetic clutch, combinations thereof, and the like. The other clutches described herein may also be any of the aforementioned types or combinations of clutch types. Further, the mode clutch 120 as well as the other clutches described herein may be actuated via electro-mechanic actuators, pneumatic actuators, hydraulic actuators, electro-magnetic actuators, barrel cam actuators, combinations thereof, and the like. Shift forks, such as translational or rotational shift forks, may specifically be used to actuate at least a portion of the clutches described herein.

Differentiating meshed planet compound planetary gear set 105 is rotationally coupled to mode planetary gear set 104. To expound, in the illustrated example, the ring gear 114 in the mode planetary gear set 104 is coupled to a ring gear 122 in differentiating meshed planet compound planetary gear set 105 via shafts 124 and/or other suitable mechanical component. As discussed in greater detail herein, a transmission disconnect clutch 147 may be coupled to the shafts 124 to provide disconnect functionality between the mode planetary gear set 104 and the differentiating meshed planet compound planetary gear set 105. Attaching the differentiating meshed planet compound planetary gear set and the mode planetary gear set in this manner allows the transmission to achieve a compact arrangement and a desired gear ratio.

Differentiating meshed planet compound planetary gear set 105 further includes a set of planet gears 126, a set of planet gears 128, and a sun gear 130. A carrier 132 is further included in the differentiating meshed planet compound planetary gear set 105 that has the set of planet gears 126 and the set of planet gears 128 rotatably mounted thereto. In the illustrated example, an output shaft 134 is coupled to the carrier 132 and another output shaft 136 is coupled to the sun gear 130. In turn, the output shafts 134 and 136 are rotationally coupled to axle assemblies 107 and 109 via mechanical components 138 and 139, respectively. The mechanical components 138 and 139 may include joints (e.g., u-joints), shafts, combinations thereof, and the like. The axle assemblies 107 and 109 each include a differential 140 and axle shafts 141 (e.g., half shafts) coupled thereto. In turn, the axle shafts 141 are rotationally coupled to drive wheels 142. However, in other examples, the axle shafts 141 may be coupled to wheel end gear reductions and/or other suitable mechanical components.

In the electric drive 100 depicted in FIG. 1, the carrier 132 and the sun gear 130 of differentiating meshed planet compound planetary gear set 105 function as the transmission's outputs and the sun gear 118 of the Ravigneaux gear set functions as the transmission's input. However, front-rear differentials with different output configurations may be used in the electric transmission.

The mode planetary gear set 104 and the differentiating meshed planet compound planetary gear set 105 are concentric with the electric drive's output rotational axis, in the illustrated example. In this way, the electric drive's compactness is increased when compared to electric drives with non-concentric arrangement. A rotational axis 180 of the differentiating meshed planet compound planetary gear set 105, is provided in FIG. 1, for reference. It will be understood, that the rotational axis of the input of the mode planetary gear set 104 and the rotational axes of the output shafts 134 and 136 are arranged coaxial to the rotational axis 180.

The use of the mode planetary gear set 104 and differentiating meshed planet compound planetary gear set 105 may allow additional shafts and shifting gears to be omitted from the transmission (if desired), reduces packaging, decreases transmission width, and reduces the overall axial length allowing for a more compact and power dense electric drive design, if desired. In this way, transmission efficiency is increased.

As discussed above, when the mode planetary gear set 104 is operated in one of the two lower modes (i.e., the first mode or the second mode), there is relative speed between the elements of the multi-speed mode planetary gear set. In the third mode, the mode planetary gear set is locked up and rotates as one. The differentiating meshed planet compound planetary gear set 105 may also typically rotate as one and solely differentiates during specific conditions. The majority of the electric drive's life may be in the highest mode, in certain end-use platforms, thereby decreasing component wear, decreasing windage losses, and increasing electric drive efficiency.

A coordinate axis system is provided in FIG. 1, as well as FIGS. 2-9, for reference and to orient the views, when appropriate. The z-axis may be a vertical axis (e.g., parallel to a gravitational axis), the x-axis may be a lateral axis (e.g., horizontal axis), and the y-axis may be a longitudinal axis, in one example. However, in other examples, the axes may have other orientations. A rotational axis 180 of the sun gear 130 is further provided for reference in FIG. 1. The mode planetary gear set 104 and the differentiating meshed planet compound planetary gear set 105 are coaxially arranged, in the illustrated example. The other electric transmissions described herein also exhibit the coaxial arrangement between the mode planetary gear set and the differential. In this way, the electric transmission is able to achieve a desired space efficiency.

FIG. 1 further depicts an electric machine 143 in the electric drive 100. As described herein the electric machines associated with the electric drives may be traction motors (e.g., motor-generators). The electric machine 143 depicted in FIG. 1 is specifically arranged concentric to the differentiating meshed planet compound planetary gear set 105 and the mode planetary gear set 104. To elaborate, an inner diameter 144 of a rotor 145 of the electric machine 143 is shown circumferentially surrounding at least a portion the transmission and specifically the mode planetary gear set 104. However, as discussed in greater detail herein, the electric machine 143 may have a variety of suitable positions and orientations. At least a portion of the mode planetary gear set 104 is positioned in an interior opening of the electric machine, in the illustrated example.

FIG. 1 also depicts a front-rear differential locking clutch 146 and a transmission disconnect clutch 147. The differential locking clutch 146 is configured to rotationally couple the carrier 132 and the ring gear 122 in the differentiating meshed planet compound planetary gear set 105. In this way, the differentiating meshed planet compound planetary gear set is able to be selectively locked to increase electric drive performance, particularly in low-traction operating environments (e.g., four wheel drive applications). The differential locking clutch 146 allows the output shafts 134 and 136 of the differentiating meshed planet compound planetary gear set 105 to be selectively locked for rotation with one another. Further, the transmission disconnect clutch 147 is configured to selectively decouple the ring gear 122 in the differentiating meshed planet compound planetary gear set 105 and the ring gear 114 in the mode planetary gear set 104. The transmission disconnect clutch 147 allows the differentiating meshed planet compound planetary gear set 105 to be selectively decoupled from the mode planetary gear set 104. One or both of the differential locking clutch 146 and the transmission disconnect clutch 147 may be incorporated into any of the transmissions described herein. The transmission disconnect clutch 147 allows vehicle driveline efficiency to be increased for towing or for hybrid applications, for instance.

As indicated above, the transmission disconnect clutch 147 and the front-rear differential locking clutch 146 may be dog clutches, synchronizers, friction clutches (e.g., wet friction clutches), radial clutches, face clutches, curvic clutches, magnetic clutches, combinations thereof, and the like. Further, the transmission disconnect clutch 147 and the differential locking clutch 146 may be actuated via electromechanic actuators, pneumatic actuators, hydraulic actuators, electro-magnetic actuators, barrel cam actuators, combinations thereof, and the like. Shift forks, such as translational or rotational shift forks, may specifically be used to actuate at least a portion of the clutches described herein, as previously indicated.

Bearings 182 may be coupled to an input shaft 119 of the transmission 102. The input shaft 119 connects the mode planetary gear set 104 and the electric machine 143. As described herein a bearing may include an inner race, roller elements (e.g., cylindrical rollers, spherical balls, tapered cylindrical rollers, needle rollers, bushings, and the like), and an outer race. A bearing 184 is coupled to the sun gear 106 in the mode planetary gear set 104, in the illustrated example. Further, a bearing 186 is coupled to the carrier 108 in the mode planetary gear set. Another bearing 188 is coupled to the carrier 108 and the ring gear 114, in the illustrated example. Further, in the illustrated example, bearings 190 and 198 are coupled to shafts 124 and/or other suitable mechanical structures which are connected to the ring gears 114 and 122. A bearing 192 may be coupled to the ring gear 122 and the carrier 132, a bearing 194 may be coupled to the output shaft 136 and the carrier 132, and a bearing 196 may be coupled to the carrier 132. The bearings in the transmission may have another suitable arrangement in alternate embodiments.

As shown in FIG. 1, the EV 103 may further include a control system 150 with a controller 152. The controller 152 may include a microcomputer with components such as a processor 154 (e.g., a microprocessor unit), input/output ports, an electronic storage medium 156 for executable programs and calibration values (e.g., a read-only memory chip, random access memory, keep alive memory, a data bus, and the like). The storage medium may be programmed with computer readable data representing instructions which are executable by a processor for performing the methods, control techniques, and the like described herein as well as other variants that are anticipated but not specifically listed. Therefore, the electronic storage medium 156 may hold instructions stored therein that when executed by the processor 154 cause the controller 152 to perform the various method steps described herein.

The controller 152 may receive various signals from sensors 158 coupled to different regions of the EV 103 and specifically the electric drive 100. For example, the sensors 158 may include one or more motor speed sensors (elaborated upon below), shaft/gear speed sensors, thermocouples, pressure sensors, a pedal position sensor to detect a depression of an operator-actuated pedal (e.g., an accelerator pedal and/or a brake pedal), speed sensors at the vehicle wheels, and the like. An input device 160 (e.g., accelerator pedal, brake pedal, gear selector, combinations thereof, and the like) may further provide input signals indicative of an operator's intent for vehicle control.

Upon receiving the signals from the various sensors 158 of FIG. 1, the controller 152 processes the received signals, and employs various actuators 162 of vehicle components to adjust the components based on the received signals and instructions stored on the memory of controller 152. For example, the controller 152 may receive an accelerator pedal signal indicative of an operator request for a vehicle acceleration adjustment. In response, the controller 152 may command operation of inverters which are electrically coupled to an electric machine which provides power to the mode planetary gear set to increase the power delivered from the motor to the transmission 102. The other controllable components in the vehicle may function in a similar manner with regard to sensor signals, control commands, and actuator adjustment, for example. Further, the control system 150 may be used in any of the electric drive systems and transmissions described herein.

The controller 152 may include instructions that when executed cause the mode clutch 120 to shift between the first mode, the second mode, and the third mode based on vehicle and electric drive operating conditions. For instance, the electric drive 100 may be operated in the first mode when the vehicle is traveling at lower vehicle speeds. When, the vehicle speed surpasses a first threshold, the mode clutch may shift to the second mode and when the vehicle speed surpasses a second threshold, the clutch may shift from the second mode to the third mode. This shifting sequence may also be implemented in the reverse order through the modes. Further, the shifting sequence may not occur sequentially and therefore may skip modes, if desired. For example, the electric drive may be commanded to start in the second mode or may downshift from the third mode to the first mode. The control system 150 described above may be used in any of the electric drives and transmissions described herein.

FIGS. 2-5 depict different electric machine and gear train arrangements for the input of the mode planetary gear set 104 in different electric drive architectures. The architecture of the mode planetary gear set 104, the differentiating meshed planet compound planetary gear set 105, the mode clutch 120, the differential locking clutch 146, and the transmission disconnect clutch 147 in the transmission 102 are similar to the component architecture and layout shown in FIG. 1. Therefore, redundant description is omitted for concision. Further, it will be understood that the electric machine and input gear train arrangements may be applied to electric drives with mode gear sets, described herein. Therefore, redundant description of the overlapping components is omitted for brevity.

Figure 2:
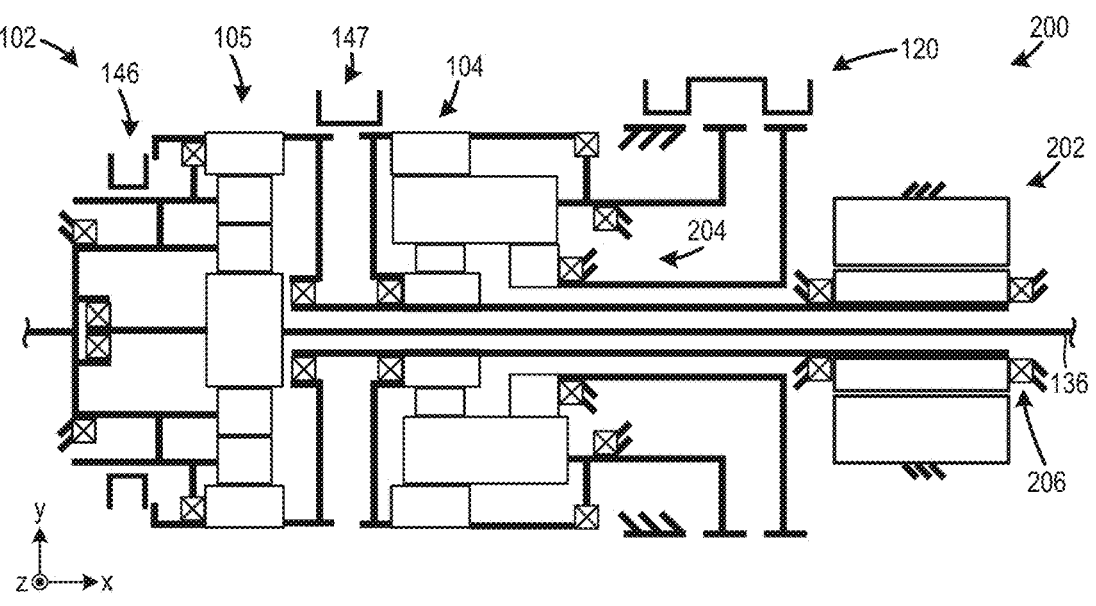
FIGS. 2-5 show different electric machine and gear train layouts in different electric drive architectures.

FIG. 2 specifically shows an electric drive 200 with an electric machine 202 that is positioned concentric to the output shaft 136 and positioned on an outboard axial side 204 of the mode planetary gear set 104. A portion of the output shaft 136 extends through an opening in the electric machine 202, in the illustrated example. In this way, the electric drive's space efficiency is increased. FIG. 2 further shows bearings 206 that are coupled to the electric machine 202. The electric drive includes additional bearings with a layout that is similar to FIG. 1. For instance, generally, rotating shafts and gears have bearings coupled thereto. The other electric drives shown in FIGS. 3-5 also include a similar bearing layout in the mode planetary gear set 104, the differentiating meshed planet compound planetary gear set 105, the transmission disconnect clutch 147, and the differential locking clutch 146. However, other bearing layouts are possible and at least one of the differential locking clutch 146 and the transmission disconnect clutch 147 may be omitted from any of the electric axle architectures shown in FIGS. 1-5.

Figure 3:
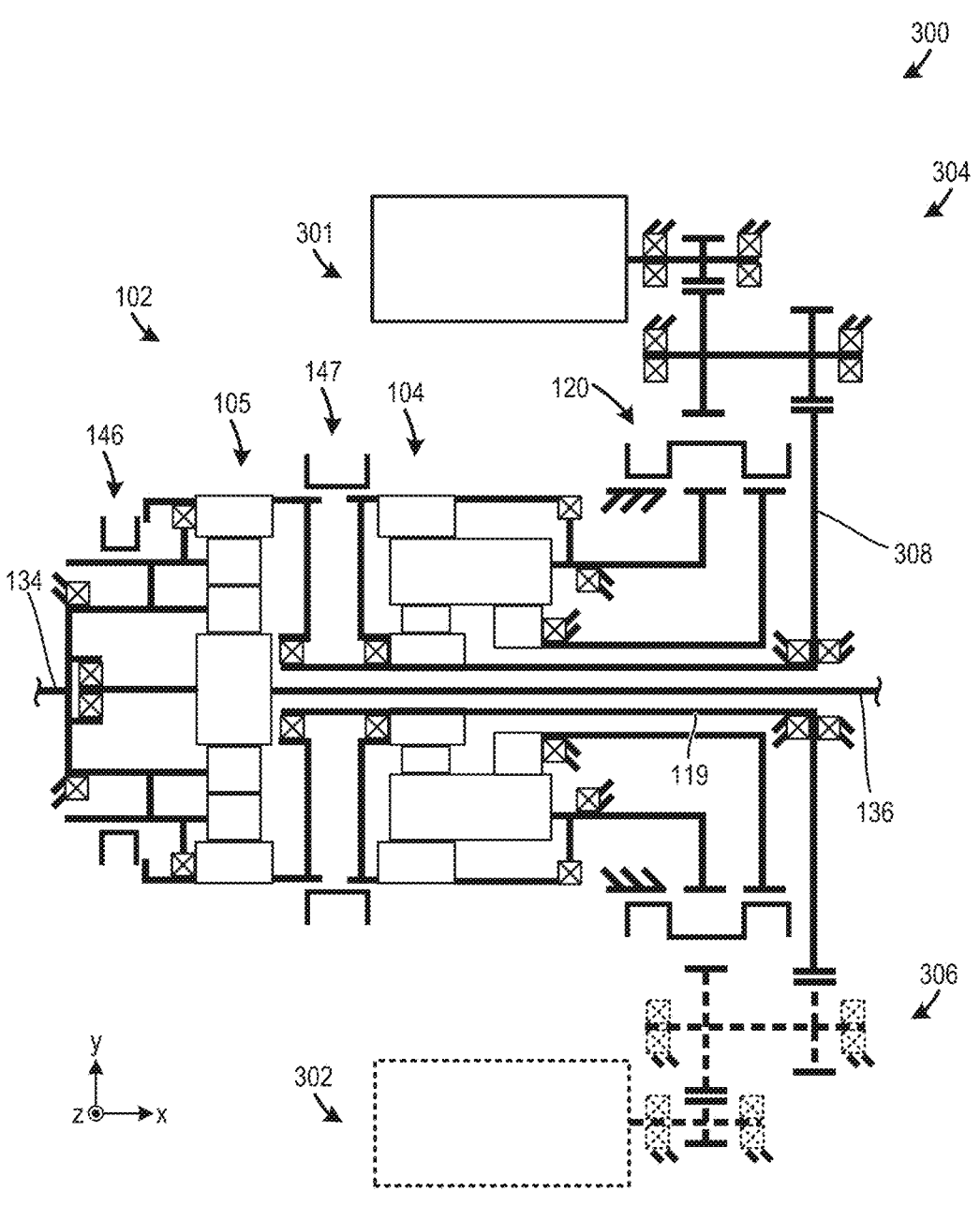

FIG. 3 shows an electric drive 300 with two electric machines 301 and 302 which are each arranged parallel to one of the output shafts 134 and 136 and mechanically attached to the input of the transmission 102 using gear trains 304 and 306. A gear 308 meshes with gears in each of the gear trains 304 and 306 and provides a mechanical connection between the input shaft 119 of the mode planetary gear set 104. It will be appreciated that the electric machine 302 and corresponding gear train 306 are optional and therefore may be omitted from the electric drive, in alternate embodiments. More generally, a variety of gear train layouts that are connected to the input of the mode planetary gear set may be used. For instance, the gear trains used to connect the first electric machine and/or the second electric machine may include fewer or additional gear passes. In alternate examples, one or more planetary gear sets (e.g., simple planetary gear sets, compound planetary gear sets, and the like) may be used to connect the one or more electric machine(s) to the mode planetary gear set. For instance, a planetary gear set which is coaxial to the electric machine may be used to connect the electric machine to the mode planetary gear set. Additionally or alternatively, a planetary gear set which is positioned coaxial to the rotational axis of the output shaft 136 may be used to rotationally couple the electric machine to the mode planetary gear set. In any of the embodiments where one or more planetary gear sets provide the input connection for the mode planetary gear set, a carrier in the planetary gear set may be grounded, a ring gear in the planetary gear set may be grounded, or a sun gear in the planetary gear set may be grounded, in different examples. Additional gear passes, chains, belts, combinations thereof, and the like may additionally or alternatively be used to transfer mechanical power between the one or more electric machines to the mode planetary gear set.

Further, it will be understood, that any of the electric drives described herein may include a second electric machine, if desired. For instance, the second electric machine may be coupled to the input of the mode planetary gear set in an identical manner to the mechanical connection formed between the first electric machine and the input of the mode planetary gear set, in one example. In another example the second electric machine may be coupled to the input of the mode planetary gear set using a different gearing arrangement to allow a different electric machine to mode planetary gear set input ratio, which may allow the second electric machine to have different characteristics than the first electric machine. Additionally, a disconnect clutch may be arranged between the second electric machine and the mode planetary gear set to decouple the second electric machine from the mode planetary gear set to further increase efficiency, in some instances.

Figure 4:
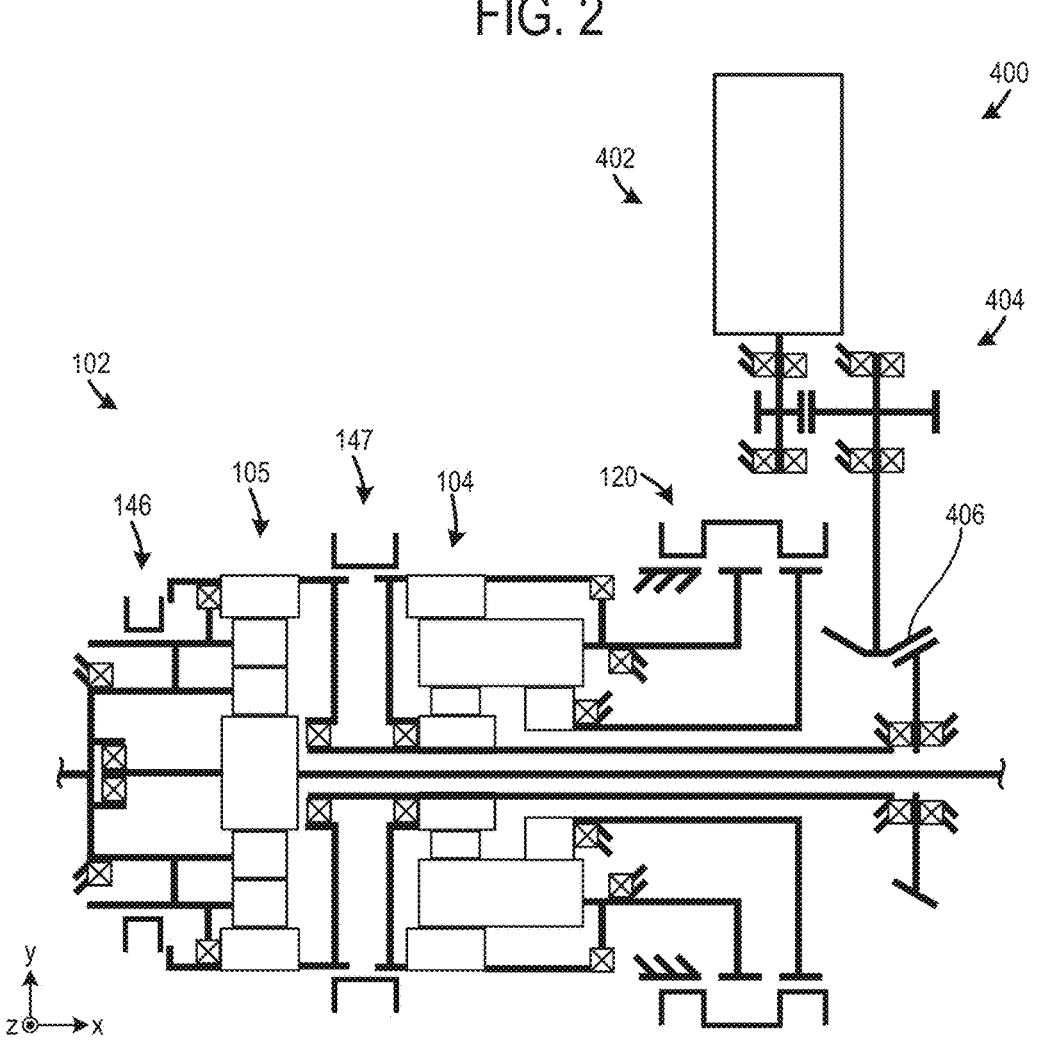

FIG. 4 shows an electric drive 400 with electric machine 402 arranged perpendicular to the rotational axis of the transmission 102. A gear train 404 which includes bevel gears 406 provides input to the mode planetary gear set 104. Similar to exemplary electric drive 300 depicted in FIG. 3, the addition of a second electric machine, and a second electric machine disconnect clutch has been considered.

Figure 5:
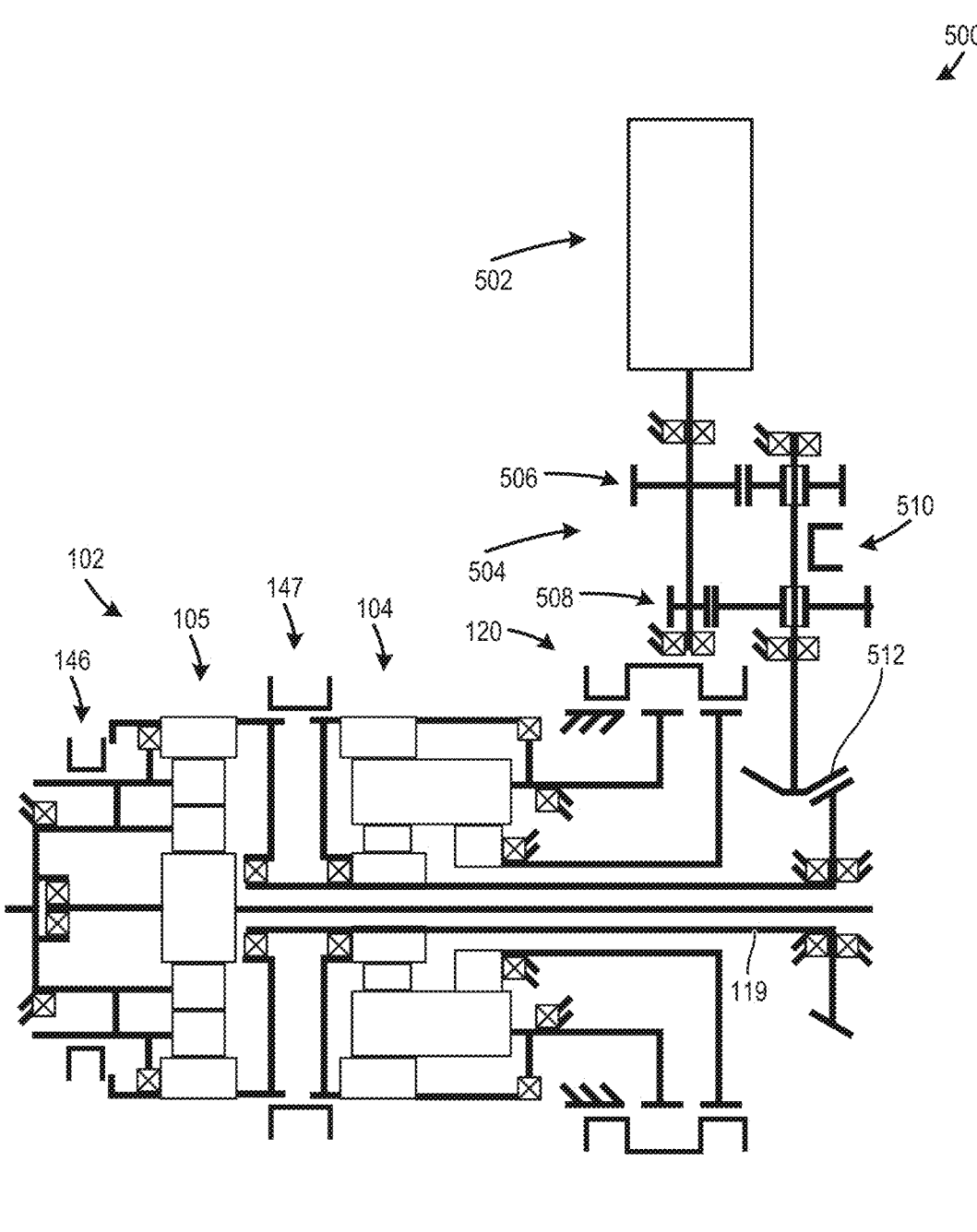

FIG. 5 shows an electric drive 500 with electric machine 502 arranged perpendicular to the rotational axis of the transmission 102. In the illustrated example, the electric drive includes an input gear train 504 with multiple gear reductions 506 and 508 which are selectable via a clutch 510. In this way, the selectable gearing in the transmission may be further expanded which may allow the electric machine to be more efficiently operated. Similar to exemplary electric drive 300 depicted in FIG. 3, the addition of a second electric machine, and a second electric machine disconnect clutch has been considered. However, as noted above, a variety of gear train layouts which provide input to the mode planetary gear set have been contemplated. Further, bevel gears 512 are provided in the gear train 504 to connect the gear train to the input shaft 119.

It will be appreciated that electric drives which include combined input gear train and/or motor arrangement features from two or more of FIGS. 1-5 have been envisioned. Further, any of the different motor and/or input gear train arrangements may be used with any of the transmission architectures or combinations of the transmission architecture described herein.

Figure 6:
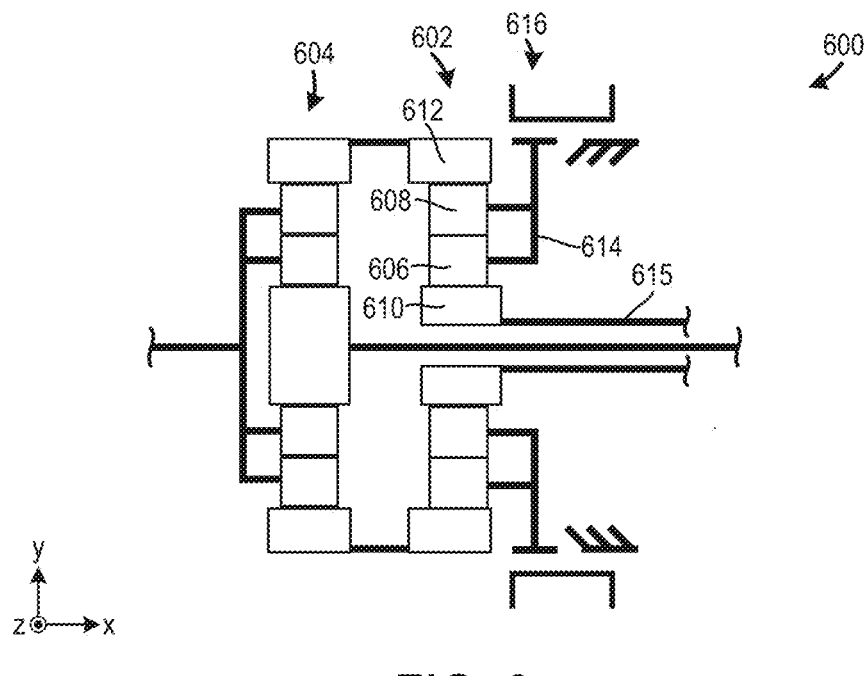
FIGS. 6-8 show different mode planetary gear set configurations in exemplary electric transmissions.

FIG. 6 shows another example of a transmission 600 for an electric drive. The transmission 600 again includes a mode planetary gear set 602 and a differentiating meshed planet compound planetary gear set 604 that are again coaxially arranged. The differentiating meshed planet compound planetary gear set 604 is similar in structure and function to the previously described differentiating meshed planet compound planetary gear sets. Therefore, redundant description of these gear sets is omitted for brevity.

In the illustrated example, the mode planetary gear set 602 is a meshed planet compound planetary gear set, in the illustrated example. To expound, the mode planetary gear set 602 comprises two sets of planetary gears 606 and 608 where the planetary gears mesh with one another, in the illustrated example. Further the planetary gears in the set of planetary gears 606 mesh with a sun gear 610 and the planetary gears in the set of planetary gears 608 mesh with a ring gear 612. However, the mode planetary gear set may have a greater number of planetary gear sets and/or a different gear architecture, in other examples. The sets of planetary gears 606 and 608 are rotatably mounted on a carrier 614. Further, an input shaft 615 is connected to the sun gear 610, in the illustrated example. It will be understood that the input shaft 615 may be coupled to a traction motor via shafts, gear passes, chains, belts, combinations thereof, and the like, as previously discussed.

The mode planetary gear set 602 may be specifically configured to shift between two modes. However, electric drives with a greater number of speeds, such as a three-speed electric drive, a four-speed electric drive, etc., have been contemplated. To enable the multi-speed functionality of the transmission, a mode clutch 616 is provided in the transmission. The mode clutch 616 is configured to ground the carrier 614 in a first mode, and rotationally couple the carrier 614 and the ring gear 612 in a second mode. The mode clutch 616 is in the first mode in the illustrated example. However, the mode clutch 616 may be switched into the different modes based on operating conditions of the electric drive and/or vehicle. Further, the first mode has a higher gear ratio than the second mode. The specific gear ratios associated with the modes may be selected based on factors such as electric motor type and performance characteristics, vehicle weight, vehicle performance targets, and the like.

As previously discussed, the mode clutch 616 may be a dog clutch, a synchronizer, a friction clutch (e.g., a wet friction clutch), a radial clutch, a face clutch, a curvic clutch, a magnetic clutch, combinations thereof, and the like.

Figure 7:
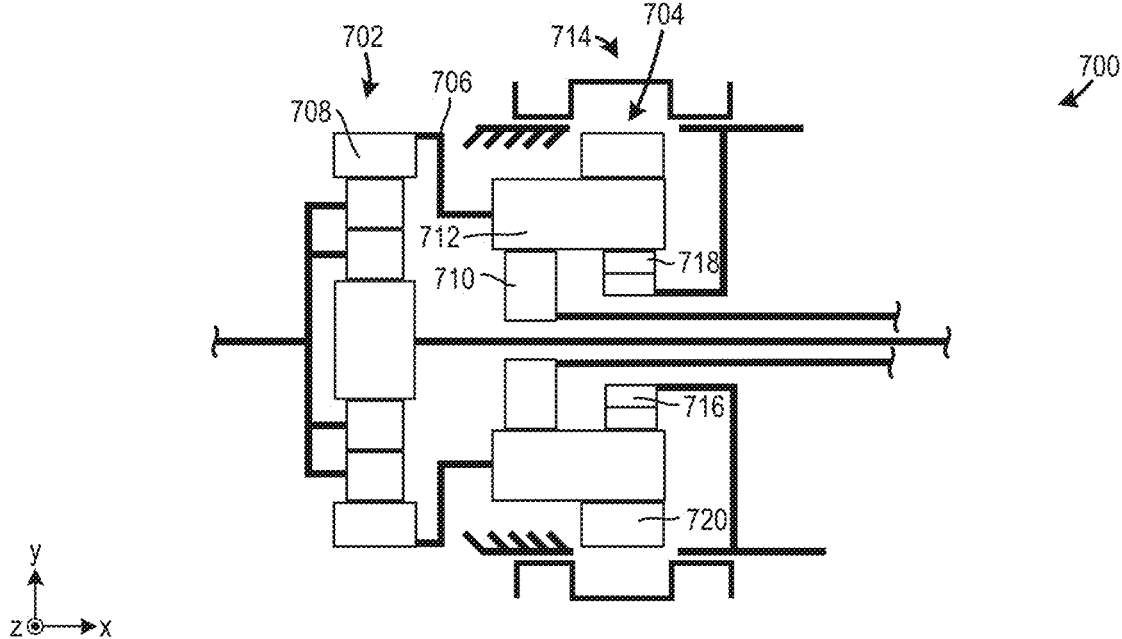

FIG. 7 shows another example of a transmission 700 for an electric drive. The transmission 700, in the illustrated example, again includes a differentiating meshed planet compound planetary gear set 702 similar to the previously described differentiating meshed planet compound planetary gear sets. Redundant description of the differentiating meshed planet compound planetary gear set is omitted for concision.

The transmission 700 also includes a Ravigneaux mode planetary gear set 704 with a different architecture than the previously described Ravigneaux mode planetary gear sets. To expound, the Ravigneaux mode planetary gear set 704 includes a carrier 706 that is rotationally coupled to a ring gear 708 of the differentiating meshed planet compound planetary gear set 702. Further, a sun gear 710 in the Ravigneaux mode planetary gear set 704 which meshes with a set of planet gears 712 functions as the input of the Ravigneaux mode planetary gear set 704. Further, a mode clutch 714 is configured to ground the ring gear 720 which meshes with planet gears 712 in a first mode, ground the sun gear 716 which meshes with planet gears 718 in a second mode, and rotationally couple the ring gear 720 and the sun gear 716 in a third mode. The set of planet gears 718 mesh with the set of planet gears 712, in the illustrated example. The set of planet gears 718 and the set of planet gears 712 are rotatably mounted to the carrier 706. In this way, the input and output of the mode planetary gear set may be varied. However, other planetary gear set configurations are possible, including arrangements were the planet gears 712 includes a stepped planet assembly.

Figure 8:
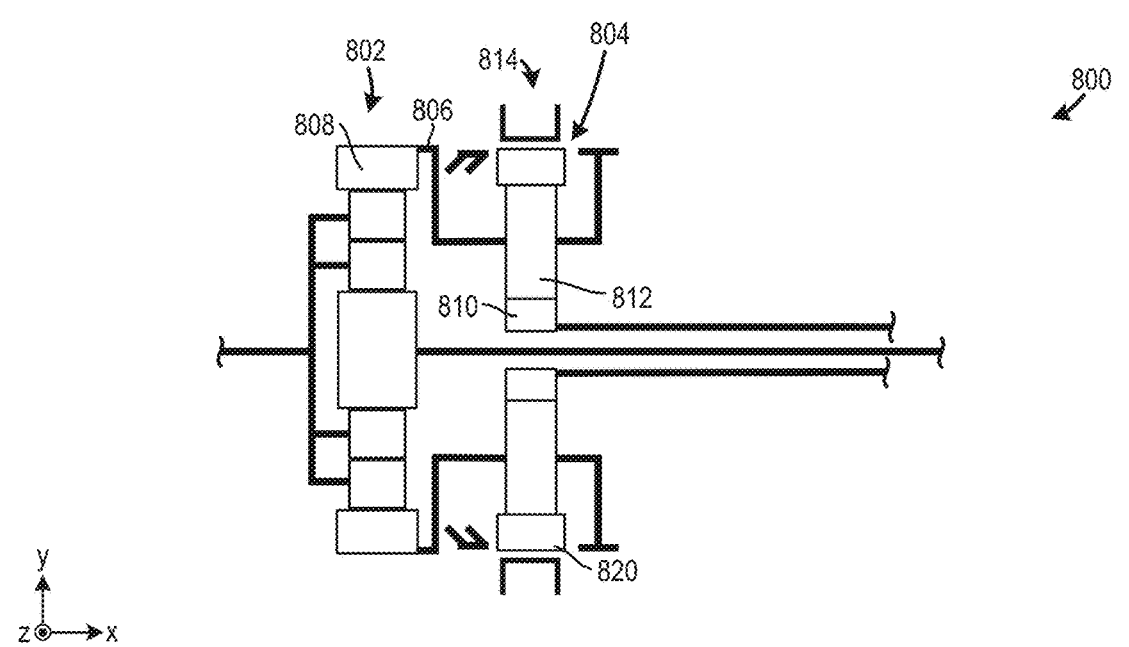

FIG. 8 shows another example of a transmission 800 for an electric drive. The transmission 800, in the illustrated example, again includes a differentiating meshed planet compound planetary gear set 802. The transmission 800 also includes a mode planetary gear set 804 with a different architecture than the previously described mode planetary gear sets. To expound, the mode planetary gear set 804 includes a carrier 806 that is rotationally coupled to a ring gear 808 of the differentiating meshed planet compound planetary gear set 802. Further, a sun gear 810 in the mode planetary gear set 804 which meshes with a set of planetary gears 812 functions as the input of the mode planetary gear set 804 is further depicted in FIG. 8. Further, a mode clutch 814 is configured to ground the ring gear 820 which meshes with gears in the set of planetary gears 812 in a first mode and rotationally couple the ring gear 820 and the carrier 806 in a second mode.

Still further, the planetary gear sets described herein may take the form of stepped planet compound planetary gear sets, and/or magnetic planetary gear sets. It will also be appreciated that the additional planetary gear sets (e.g., a simple planetary gear set or a meshed planet compound planetary gear set) may include a ring gear that is grounded, a carrier that is rotationally coupled to the differentiating meshed planet compound planetary gear set, and a sun gear that is coupled to the mode planetary gear set. Alternatively, the planetary gear set may include a carrier that is grounded, a ring gear that is rotationally coupled to the differentiating meshed planet compound planetary gear set, and a sun gear that is coupled to the mode planetary gear set.

Figure 9:
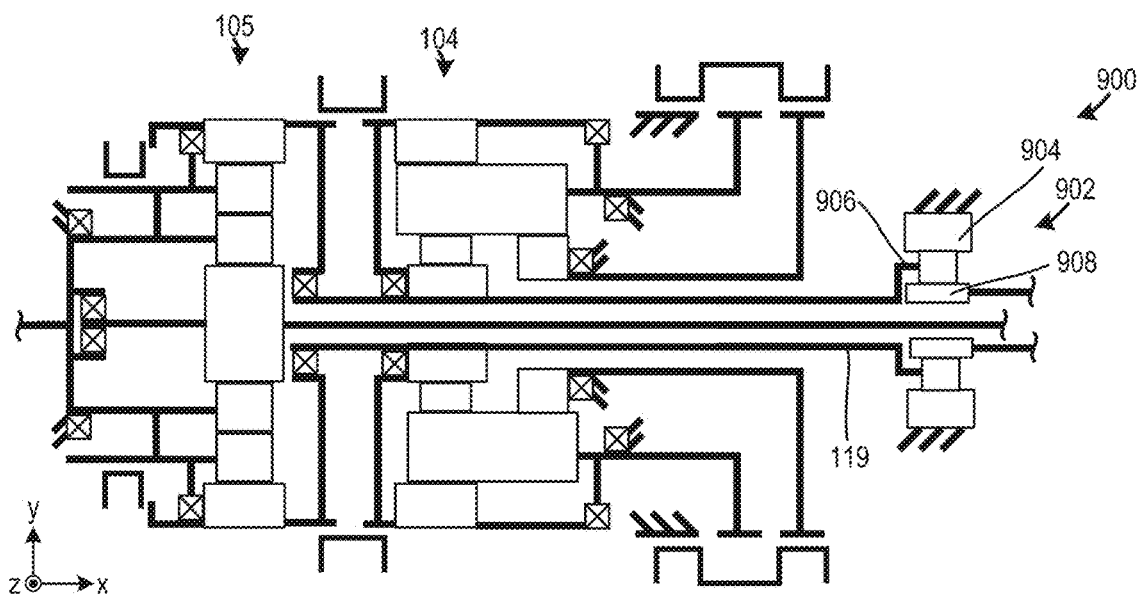
FIG. 9 shows an electric transmission with a planetary gear set that provides input for a mode planetary gear set.

FIG. 9 shows an electric drive 900 with a transmission that has the mode planetary gear set 104 and the differentiating meshed planet compound planetary gear set 105, that are described above with regard to FIG. 1. However, as shown in FIG. 9, a planetary gear set 902 is rotationally coupled to the input shaft 119. The planetary gear set 902 is a simple planetary gear set in the illustrated example. The planetary gear set 902 includes a ring gear 904 that is grounded, a carrier 906 that is rotationally coupled to the input shaft 119, and a sun gear 908 that is coupled to upstream components, such as an electric machine. Alternatively, the planetary gear set 902 may include a carrier 906 that is grounded, a ring gear 904 that is rotationally coupled to the input shaft 119, and a sun gear 908 that is coupled to upstream components such as an electric machine. However, in other examples, the planetary gear set may be a meshed planet compound planetary gear set with two sets of planet gears that mesh with one another. To elaborate, a meshed planet compound planetary gear set that is coupled to the input shaft 119 may have a similar construction to the components in the differentiating meshed planet compound planetary gear set 105 with different input and output connections. For instance, in the meshed planet compound planetary gear set example, a sun gear may be coupled to upstream components, a carrier may be coupled to the input shaft 119, and the ring gear may be grounded, for instance. Alternatively, in the meshed planet compound planetary gear set example, a sun gear may be coupled to upstream components, a ring gear may be coupled to the input shaft 119, and the carrier may be grounded.

Furthermore, it will be appreciated that the differentials described in FIGS. 1-9 may further be combined with springs, clutches or cones, cam ramps, helical gears, worm gears, spur gears, viscous couplings, gerotors, bias friction components, and electronic components to create a limited slip differential (LSD) (e.g., a torque sensing limited slip differential), an automatic torque biasing (ATB) limited slip differential, a clutch pack style limited slip differential, a bevel gear differential, a dual sun differential, a reduction differential, and the like, to enhance front to rear axle bias, reduce front to rear axle slip, and/or create 4WD functionality, thereby increasing customer appeal.

It will be appreciated that any of the electric drives described herein may include additional gear sets, in some examples. For instance, a planetary gear set (e.g., a simple planetary gear set or a meshed planet compound planetary gear set) may be positioned between the differentiating meshed planet compound planetary gear set and the mode planetary gear set or upstream of the mode planetary gear set, in different examples. As described herein a simple planetary gear set is a planetary gear set with solely a ring gear, a sun gear, and multiple planet gears that are in the same plane as the ring gear and the sun gear. Further, as described herein a meshed planet compound planetary gear set is a planetary gear set with a ring gear, a sun gear, and multiple sets of planet gears in mesh in the plane of the ring gear and sun gear and circumferentially aligned in the same plane as the ring and the sun gears.

Still further, in one use-case example, the differentiating meshed planet compound planetary gear set may have a 2:1 ratio which gives a 1:1 output. However, if the planetary ratio is changed, a front to rear torque and speed bias may be created. The front to rear speed difference may be resolved with different gearing in the front and rear differential. Further, a differentiating meshed planet compound planetary with a biased output may always have the meshed planet gears rotating in relation to each other, if desired. More generally, the electric transmissions described herein may have a variety of ratios which may be selected based on the end-use design goals of the vehicle platform. As such, the ratios illustrated in the figures are use-case ratios and different ratios may be used in the electric transmissions. Further, the exact location and number of the bearings in the electric transmission architectures illustrated in the FIGS. 1-5 and 9 is suggestive and exemplary in nature and it will be understood that alternate bearing layouts, types, quantities, etc. may be used in alternate examples. Further, the electric transmissions described herein may utilize one or more transverse motors which may be coupled to the transmission's input via hypoid gears or other suitable spiral or bevel spiral gears, in some examples. In these examples, the motor may be engaged to the hypoid gear with a mating pinion, and between the motor and pinion there may be other gear passes and/or shiftable gears. Shiftable gears may be positioned on either parallel mating shaft, in different examples. Further, additional gear passes may be added to the electric transmissions, if desired.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

Motor and shift control logic/programs, inverters, electronic control units (ECUs), memory storage, throttle, brake, speed, and inclination sensors and the like, shift actuators, etc. may further be used in any of the electric transmissions described herein.

FIGS. 1-9 provide for a method for electric transmission operation wherein the transmission shifts between two of the modes based on vehicle operating conditions. To elaborate, the electric transmission may be a two-speed or a three-speed transmission, as described above. In either configuration, the mode clutch may be operated to transition the mode planetary gear set between two of the distinct modes. The method may further selectively lock the differentiating meshed planet compound planetary gear set via operation of a differential locking clutch in the differentiating planetary gear set. The method may even further include, selectively disconnecting the electric motor and/or mode planetary gear set via operation of a transmission disconnect clutch to allow towing options, or other engine, hybrid, or BEV vehicle functionality modes, thereby increasing customer appeal.

The invention will be further described in the following paragraphs. In one aspect, an electric drive system is provided that comprises an electric machine; a multi-speed transmission rotationally coupled to the electric machine, rotationally coupled to two output shafts, and including: a differential gear set rotationally coupled and positioned coaxial to a mode planetary gear set; and a mode clutch configured to shift between two operating modes. In one example, the mode planetary gear set may be a Ravigneaux gear set rotationally coupled to the differential gear set; and the mode clutch is configured to selectively: ground a carrier or a ring gear in the Ravigneaux gear set; ground a sun gear in the Ravigneaux gear set; and rotationally couple the carrier or the ring gear to the sun gear in the Ravigneaux gear set. Further, in one example, the ring gear or the carrier in the mode planetary gear set may be rotationally coupled to a ring gear or the carrier in the differential gear set and a sun gear in the mode planetary gear set is coupled to an upstream component that receives mechanical power from the electric machine. Further, in one example, the differential may be a differentiating meshed planet compound planetary gear set. Even further in one example, the differentiating meshed planet compound planetary gear set may include a carrier rotationally coupled to a first output shaft and a sun gear rotationally coupled to a second output shaft. In another example, the electric drive system may further comprise a differential locking clutch configured to selectively rotationally couple a ring gear in the differentiating meshed planet compound planetary gear set to a carrier in the differentiating meshed planet compound planetary gear set to lock rotation of the two output shafts. In another example, the electric drive system may further comprise a transmission disconnect clutch configured to selectively disconnect the mode planetary gear set from the differential gear set. In another example, the mode planetary gear set is a meshed planet compound planetary gear set rotationally coupled to the differential; and the mode clutch is configured to selectively: ground a carrier or a ring gear in the meshed planet compound planetary gear set; and rotationally couple the carrier to the ring gear in the meshed planet compound planetary gear set.

In another aspect, a method for operating an electric drive system is provided that comprises operating a mode clutch to transition between two operating modes; wherein the electric drive system includes: an electric machine; a multi-speed transmission rotationally coupled to the electric machine, rotationally coupled to two output shafts, and including: a differential gear set rotationally coupled and positioned coaxial to a mode planetary gear set; and the mode clutch. In one example, the mode planetary gear set may be a Ravigneaux gear set and the mode clutch is configured to: in a first mode, ground a carrier or a ring gear in the Ravigneaux gear set; in a second mode, ground a sun gear in the Ravigneaux gear set; and in a third mode, rotationally couple the carrier or the ring gear to the sun gear in the Ravigneaux gear set; wherein a transition between two operating modes includes a first mode to a second mode, or a second mode to a third mode. Further, in one example, the mode planetary gear set is a meshed planet compound planetary gear set and the mode clutch is configured to: in a first mode, ground a carrier or a ring gear that are included in the meshed planet compound planetary gear set; and in a second mode, rotationally couple the carrier to the ring gear in the meshed planet compound planetary gear set; wherein a transition between two operating modes includes a first mode to a second mode. Further, in one example, the differential is a differentiating meshed planet compound planetary gear set. In one example, the method may further comprise operating a differential locking clutch to rotationally couple a ring gear in the differentiating meshed planet compound planetary gear set to a carrier in the differentiating meshed planet compound planetary gear set to lock rotation of the two output shafts. In one example, the method may further comprise operating a transmission disconnect clutch to selectively disconnect the mode planetary gear set from the differential gear set.

In another aspect, an electric drive system is provided that comprises an electric machine; a multi-speed transmission rotationally coupled to the electric machine, rotationally coupled to two output shafts, and including: a differential gear set rotationally coupled and positioned coaxial to a mode planetary gear set; and a mode clutch configured to: ground a carrier or a ring gear in the mode planetary gear set in a first mode, ground a sun gear in the mode planetary gear set in a second mode, and rotationally couple the carrier or the ring gear to the sun gear in the mode planetary gear set in a third mode; or ground a carrier or a ring gear that are included in the mode planetary gear set in a first mode, and rotationally couple the carrier to the ring gear in a second mode. In one example, the mode planetary gear set may be a Ravigneaux gear set. In yet another example, the mode planetary gear set is a meshed planet compound planetary gear set. In yet another example, the differential may be a differentiating meshed planet compound planetary gear set. Still further, in another example, the electric drive system may further comprise a differential locking clutch configured to selectively rotationally couple a ring gear in the differentiating meshed planet compound planetary gear set to a carrier in the differentiating meshed planet compound planetary gear set to lock rotation of the two output shafts. In another example, the electric drive system may further comprise a transmission disconnect clutch configured to selectively disconnect the mode planetary gear set from the differential gear set.

Further, the electric transmissions described herein may include control systems that include a controller with a processor and memory that stores instructions for carrying out the method steps described herein. The control methods and routines disclosed herein may be stored as executable instructions in non-transitory memory and may be carried out by a system including the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for EVs (e.g., HEVs, BEVs, etc.), agriculture vehicles or machines, marine vehicles or machines, motorcycles, recreational vehicles, and on and off highway vehicles, mining vehicles, rail vehicles, manufacturing machinery, industrial machinery, and the like, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive system, comprising:
an electric machine; and
a multi-speed transmission rotationally coupled to the electric machine and including:
    a differential gear set rotationally coupled and positioned coaxial to a Ravigneaux planetary gear set; and
    a mode clutch configured to selectively:
        ground a carrier in the Ravigneaux planetary gear set;
        ground a sun gear in the Ravigneaux planetary gear set; and
        rotationally couple the carrier to the sun gear in the Ravigneaux planetary gear set;
    wherein the differential gear set is rotationally coupled to two output shafts;
    wherein a first output shaft of the two output shafts is rotationally coupled to a first drive axle that includes a first axle differential that is rotationally coupled to a first set of drive wheels; and
    wherein a second output shaft of the two output shafts is rotationally coupled to a second drive axle that includes a second axle differential that is rotationally coupled to a second set of drive wheels.

2. The electric drive system of claim 1, wherein a ring gear or the carrier in the Ravigneaux planetary gear set is rotationally coupled to a ring gear or a carrier in the differential gear set and a second sun gear in the Ravigneaux planetary gear set is coupled to an upstream component that receives mechanical power from the electric machine.

3. The electric drive system of claim 1, wherein the differential gear set is a differentiating meshed planet compound planetary gear set that includes a first set of planet gears and a second set of planet gears that mesh with one another.

4. The electric drive system of claim 3, wherein the differentiating meshed planet compound planetary gear set includes a carrier rotationally coupled to the first output shaft of the two output shafts and a sun gear rotationally coupled to the second output shaft of the two output shafts.

5. The electric drive system of claim 3, further comprising a differential locking clutch configured to selectively rotationally couple a ring gear in the differentiating meshed planet compound planetary gear set to a carrier in the differentiating meshed planet compound planetary gear set to lock rotation of the two output shafts.

6. The electric drive system of claim 1, further comprising a transmission disconnect clutch configured to selectively disconnect the Ravigneaux planetary gear set from the differential gear set.

7. A method for operating an electric drive system, comprising:
operating a mode clutch to transition between two of three operating modes;
wherein the electric drive system includes:
    an electric machine; and
    a multi-speed transmission rotationally coupled to the electric machine and including:

a differential gear set rotationally coupled and positioned coaxial to a Ravigneaux planetary gear set; and
        the mode clutch;
wherein the mode clutch is configured to:
    in a first mode, ground a carrier or a ring gear in the Ravigneaux planetary gear set;
    in a second mode, ground a sun gear in the Ravigneaux planetary gear set; and
    in a third mode, rotationally couple the carrier or the ring gear to the sun gear in the Ravigneaux planetary gear set;
wherein the transition between the two operating modes includes the first mode to the second mode, the second mode to the third mode, or the first mode to the third mode;
wherein the differential gear set is rotationally coupled to two output shafts;
wherein a first output shaft of the two output shafts is rotationally coupled to a first drive axle that includes a first axle differential that is rotationally coupled to a first set of drive wheels; and
wherein a second output shaft of the two output shafts is rotationally coupled to a second drive axle that includes a second axle differential that is rotationally coupled to a second set of drive wheels.

8. The method of claim 7, wherein the differential gear set is a differentiating meshed planet compound planetary gear set.

9. The method of claim 8, further comprising operating a differential locking clutch to rotationally couple a ring gear in the differentiating meshed planet compound planetary gear set to a carrier in the differentiating meshed planet compound planetary gear set to lock rotation of the two output shafts.

10. The method of claim 7, further comprising operating a transmission disconnect clutch to selectively disconnect the Ravigneaux planetary gear set from the differential gear set.

11. An electric drive system, comprising:
an electric machine; and
a multi-speed transmission rotationally coupled to the electric machine and including:
    a differential gear set rotationally coupled and positioned coaxial to a Ravigneaux planetary gear set; and
    a mode clutch configured to:
        ground a carrier in the Ravigneaux planetary gear set in a first mode;
        ground a sun gear in the Ravigneaux planetary gear set in a second mode; and
        rotationally couple the carrier to the sun gear in the Ravigneaux planetary gear set in a third mode;
wherein the differential gear set is rotationally coupled to two output shafts;
wherein a first output shaft of the two output shafts is rotationally coupled to a first drive axle that includes a first axle differential that is rotationally coupled to a first set of drive wheels; and
wherein a second output shaft of the two output shafts is rotationally coupled to a second drive axle that includes a second axle differential that is rotationally coupled to a second set of drive wheels.

12. The electric drive system of claim 11, wherein the differential gear set is a differentiating meshed planet compound planetary gear set that includes a first set of planet gears and a second set of planet gears that mesh with one another.

13. The electric drive system of claim 12, further comprising:

a differential locking clutch configured to selectively rotationally couple a ring gear in the differentiating meshed planet compound planetary gear set to a carrier in the differentiating meshed planet compound planetary gear set to lock rotation of the two output shafts.

14. The electric drive system of claim 12, further comprising:

a transmission disconnect clutch configured to selectively disconnect the Ravigneaux planetary gear set from the differential gear set.

\* \* \* \* \*